(12) United States Patent
Winkelhake (10) Patent No.: US 10,207,605 B2
(45) Date of Patent: Feb. 19, 2019

(54) LATCHING FITTING

(71) Applicant: component engineering services GmbH, Gifhorn (DE)

(72) Inventor: Bernd Winkelhake, Gifhorn (DE)

(73) Assignee: component engineering services GmbH, Gifhorn (DE)

( * ) Notice: Subject to any disclaimer, the term of this patent is extended or adjusted under 35 U.S.C. 154(b) by 336 days.

(21) Appl. No.: 15/027,060

(22) PCT Filed: Oct. 1, 2014

(86) PCT No.: PCT/EP2014/071043
§ 371 (c)(1),
(2) Date: Jul. 11, 2016

(87) PCT Pub. No.: WO2015/049287
PCT Pub. Date: Apr. 9, 2015

(65) Prior Publication Data
US 2016/0304001 A1    Oct. 20, 2016

(30) Foreign Application Priority Data

Oct. 4, 2013 (DE) .................. 10 2013 111 034
Dec. 18, 2013 (DE) .................. 10 2013 226 534

(51) Int. Cl.
*B60N 2/235* (2006.01)
*B60N 2/22* (2006.01)
*B60N 2/90* (2018.01)

(52) U.S. Cl.
CPC ......... *B60N 2/2362* (2015.04); *B60N 2/2227* (2013.01); *B60N 2/938* (2018.02)

(58) Field of Classification Search
None
See application file for complete search history.

(56) References Cited

U.S. PATENT DOCUMENTS

| 2,941,583 A | 6/1960 | Tischler et al. |
| 3,309,139 A | 3/1967 | Turner et al. |

(Continued)

FOREIGN PATENT DOCUMENTS

| DE | 1429438 A1 | 5/1969 |
| DE | 3211158 A1 | 9/1983 |

(Continued)

OTHER PUBLICATIONS

International Preliminary Report on Patentability dated Apr. 5, 2016 from corresponding to U.S. Appl. No. 15/027,060.

*Primary Examiner* — David E Allred
(74) *Attorney, Agent, or Firm* — Harter Secrest & Emery LLP; Thomas B. Ryan, Patent Agent (57) ABSTRACT

The invention relates to a latching fitting (10), in particular for a seat of a motor vehicle. The latching fitting (10) comprises a base plate (20), a cover plate (30), at least one blocking arm (40, 140) and an actuating plate (50). The cover plate (30) is rotatable relative to the base plate (20) and has an internal toothing (31). The blocking arm (40, 140) is arranged on the base plate (20) and is pivotable between an unlocked position, in which rotation of the cover plate (30) relative to the base plate (20) is possible, and a locked position, in which rotation of the cover plate (30) relative to the base plate (20) is blocked. The actuating plate (50) is rotatable relative to the base plate (20) and shifts the blocking arm (40, 140) between the unlocked position and the locked position. The internal toothing (31) has first blocking teeth (34) which have a vertex (35) and which are formed asymmetrically with respect to a radial axis (A) which runs through the vertex (35). The blocking arm (40, 140) has second blocking teeth (44) which are adapted for meshing with the first blocking teeth (34).

16 Claims, 6 Drawing Sheets

(56) References Cited

U.S. PATENT DOCUMENTS

| | | | |
|---|---|---|---|
| 4,230,414 A | 10/1980 | Cheshire | |
| 6,082,821 A * | 7/2000 | Baloche | B60N 2/2358 297/354.12 |
| 2003/0025377 A1 | 2/2003 | Peters | |
| 2006/0022503 A1* | 2/2006 | Reubeuze | B60N 2/2358 297/378.12 |
| 2006/0283283 A1* | 12/2006 | Jeong | B60N 2/22 74/535 |
| 2008/0047106 A1 | 2/2008 | Burckhard et al. | |
| 2009/0200850 A1 | 8/2009 | Heo | |
| 2011/0025114 A1 | 2/2011 | Berndtson et al. | |
| 2012/0313416 A1* | 12/2012 | Hiemstra | B60N 2/2356 297/354.1 |
| 2014/0239691 A1* | 8/2014 | Hellrung | B60N 2/2356 297/354.1 |
| 2015/0246625 A1* | 9/2015 | Leconte | B60N 2/2252 297/361.1 |
| 2016/0200222 A1* | 7/2016 | Desquesne | B60N 2/2252 297/354.12 |

FOREIGN PATENT DOCUMENTS

| | | |
|---|---|---|
| DE | 10102860 A1 | 8/2002 |
| DE | 102006032681 A1 | 1/2007 |
| DE | 102006056004 A1 | 8/2007 |
| DE | 102007027341 A1 | 3/2008 |
| DE | 202007012931 U1 | 9/2008 |
| DE | 112007001388 T5 | 4/2009 |
| DE | 202008001597 U1 | 6/2009 |
| DE | 112009000118 T5 | 2/2011 |
| EP | 1260405 A1 | 11/2002 |
| EP | 1818210 A2 | 8/2007 |
| FR | 2406752 A1 | 5/1979 |
| GB | 2117440 A | 10/1983 |
| WO | 0006414 A1 | 2/2000 |
| WO | 2005044617 A1 | 5/2005 |
| WO | 2008130075 A1 | 10/2008 |

* cited by examiner

LATCHING FITTING

TECHNICAL FIELD

The invention relates to a latching fitting, in particular for a seat of a motor vehicle.

BACKGROUND OF THE INVENTION

Latching fittings are used, for instance, as adjusting elements for motor vehicle seats. The latching fittings allow a movement of the backrest into a desired position. Generally there is a region in which the backrest can be moved for adjusting to a desired seat position, and one or more regions that only allow a fixed backrest position. In these positions, a loading area can be increased, for instance. Latching fittings are also known as hinge fittings, fittings or latching adjusters.

DE 101 02 860 A1 discloses a latching fitting for a motor vehicle seat with at least one bolt movable in radial direction.

From DE 20 2008 001 597 U1 a latching fitting is known which comprises a plurality of pivotable or movable blocking sections. The blocking sections are arranged on a driver plate and can be guided from the outside and locked to a ring gear.

DE 20 2007 012 931 U1 discloses a latching fitting with an internally toothed fitting part which is rotatable relative to a first fitting part, and with an eccentric which is drivable and mounted rotatable around an axis and which is able to move toothed segments or bolts in radial direction and to lock a so-called play-compensation element.

DE 10 2006 032 681 A1 displays a hinge fitting with a driving member having a non-circular drive portion, with an internally toothed first hinge part and a second hinge part and with blocking arms which co-operate with the internal toothing.

WO 00/06414 discloses a latching fitting with a housing and a cover plate which encloses the housing. The cover plate has an outer ring with a plurality of teeth. Three toothed arms are arranged in the circumferential direction of a support plate and are actuated by a drive member, which is biased in the locking direction by a spring.

WO 2005/044617 A1 discloses a hinge fitting for a motor vehicle that is provided with at least two blocking arms.

EP 1 260 405 A1 discloses a latching adjuster which has rotatable toothed levers that can mesh with an internal toothing which is provided in an intermittent manner.

From DE 32 11 158 A1 a hinge fitting for an adjustable backrest is known.

DE 10 2006 056 004 A1 describes a hinge fitting that has two mirror-inverted pairs of toothed levers.

The latching adjuster disclosed in DE 11 2007 001 388 T5 has a plurality of toothed levers, an activating plate and an intermittently provided internal toothing.

EP 1 818 210 B1 discloses an inclination adjustment mechanism for a vehicle seat that has sliding toothed levers, an actuation plate, and an intermittent internal toothing.

In WO 2008/130075 A1 a latching fitting is described that comprises a cover plate which has an inner toothing, and a support member which is rotatable relative to the cover plate. In addition, the latching adjuster comprises a plurality of toothed levers for providing a form-fitting connection between the cover plate and the support member. The toothed levers are pivotally/rotatably arranged on the supporting member. One single tooth lever has a latching projection. The cover plate has an inner circumferential portion below the inner toothing which projects towards the center of the cover plate and engages with the latching projection.

The latching adjuster disclosed in DE 11 2009 000 118 T5 comprises a cover plate which has an internal toothing, a support member which is rotatable relative to the cover plate, and a fixed control ring. In addition, the latching adjuster comprises four toothed levers for providing a form-fitting connection between the cover plate and the support member. A toothed lever has a latching projection which can engage in the control ring.

DE 10 2007 027 341 A1 discloses a latching adjuster that comprises a cover plate, which has an internal toothing, a supporting member which is rotatable relative to the cover plate, and a fixed control ring. In addition, the latching adjuster comprises four toothed levers which are arranged pivotally at the support member. Each toothed lever has a latching projection, which can engage in the control ring.

The known latching fittings are designed in a way that they have essentially the same cogging torque for both directions of rotation. The cogging torque is the torque that the latching fitting can reliably absorb before a malfunction may occur, such as slipping or even the rupture of the latching fitting. In the known latching fittings, complex control curves are employed, too, in order to prevent slipping of the latching fitting, and to ensure a reliable blocking function.

It is the object of the invention to provide a latching fitting that has a significantly larger cogging torque in one direction of rotation than in the other direction of rotation.

This object is solved by a latching fitting according to claim 1. Preferred embodiments of the latching fitting are specified in the claims.

SUMMARY OF THE INVENTION

The invention is based on the recognition of the fact that in general a latching fitting is mostly loaded in only one of its two directions of rotation. The latching fitting according to the present invention is in particular suitable for a seat of a motor vehicle. The latching fitting comprises a base plate, a cover plate, at least one blocking arm, and an actuating plate. The cover plate is rotatable relative to the base plate and has an inner toothing. The blocking arm is arranged on the base plate and is pivotable between an unlocked position, in which a rotation of the cover plate relative to the base plate is possible, and a blocked position, in which a rotation of the cover plate relative to the base plate is blocked. The actuating plate is rotatable relative to the base plate and is adapted for shifting the blocking arm between the unlocked position and the locked position. The inner toothing has first blocking teeth which have a vertex and are designed in an asymmetrical manner relative to a radial axis running through the vertex. The blocking arm has second blocking teeth which are adapted for meshing with the first blocking teeth.

The asymmetrically shaped blocking teeth result in the cogging torque being larger in one direction of rotation than in the other direction of rotation. Therefore no complex control curves need to be provided in order to prevent the latching fitting from slipping. Such blocking teeth allow a shifting of the blocking arm from the locked position into the unlocked position even if the latching fitting is loaded. Unlocking can be effected smoothly and without a stop-slip motion. In addition, such teeth have a safety function since unlocking is possible even after a crash.

In an advantageous embodiment, the first blocking teeth have a first tooth flank which extends essentially parallel to the radial axis. Preferably, the first blocking teeth have a second tooth flank, which extends at an acute angle to the radial axis. Alternatively, the second tooth flank is curved. The second blocking teeth may be shaped in the same manner.

Thus the cogging torque in the main load direction can be further increased. Additionally, in the case of a curved second tooth flank shifting of the blocking arms into the unlocked position may be facilitated.

It is preferred that the base plate has at least one mounting projection, preferably designed in a cylindrical shape. Preferably, the blocking arm is pivotably mounted on the mounting projection. Further preferably, the blocking arm is mounted on the mounting projection virtually without play.

The mounting projection reduces the play of the blocking arm and thus stabilizes the latching fitting in the locked position. Thereby, for instance, an unintended shifting of the blocking arm from the locked position due to vibrations can be avoided.

In an advantageous embodiment, the base plate has at least one supporting projection. Preferably the supporting projection has a supporting surface which is adapted for supporting the blocking arm. Further preferably the supporting projection has a first guiding surface which is adapted for guiding a portion of the blocking arm, preferably virtually without play. Further preferably the supporting projection has a second guiding surface which is adapted for guiding a portion of the blocking arm, preferably virtually without play. The supporting projection supports the blocking arm in the unlocked position and can prevent jamming of the blocking arm, for instance, due to vibration. The blocking arm has less play in the unlocked position. The first and second guiding surfaces allow a controlled movement of the blocking arm. The blocking arm has less play during movement between the unlocked position and the locked position. Therefore jamming of the blocking arm is less likely during the movement, too.

It is preferred that the blocking arm has a mount opening which is arranged at an end portion of the blocking arm. Preferably the mount opening has a diameter ranging from 3 mm to 7 mm. It is preferred that the blocking arm has a blocking portion which is arranged in a first region, preferably at a radially outer surface in the installed state, and the other end portion of the blocking arm. The blocking portion preferably has a length of between 5 mm and 15 mm in the circumferential direction. Further preferably, the blocking arm has a first control curve which has a first unlocking portion, a first locking portion, and a first supporting portion. The first control curve is preferably formed by a second portion of the blocking arm.

It is preferred that the actuating plate forms a second control curve which is adapted for co-operating with the first control curve. The second control curve preferably has a second unlocking region, a second locking region, and a second supporting region.

Due to the mount opening the blocking arm can be mounted virtually without play. This allows a reliable engagement of the blocking arm in the inner toothing. The arrangement of the blocking portion allows a better distribution of the force acting on the blocking arm, thus the blocking arm is charged more uniformly, and consequently the wear decreases. Further, the cogging torque can be increased by adjusting the actuating plate to the blocking arms. It is also possible that the regions of the first control curve are matched with the corresponding regions of the second curve, and that for instance two first support portions, however, differ from one another. The same applies to the remaining regions.

In a preferred embodiment, the latching fitting further comprises a third control curve, preferably designed in one piece and/or integrally with the base plate or the cover plate, which controls a movement of the blocking arm from the unlocked position into the locked position. Preferably, the third control curve is formed by an inner circumferential surface of a control ring.

The third control curve makes it possible to allow or not to allow a movement of the blocking arm from the unlocked position into the locked position. Therefore it can be defined in which relative rotational positions the base plate and the cover plate are interlocked.

It is preferred that the third control curve has a toothing, in particular designed in intermittent sections, which is preferably provided on an outer circumferential surface of the control ring and which is adapted to fixing the third control curve to the cover plate, preferably in a force-fitting manner.

If the third control curve is not designed in one piece with the base plate or the cover plate, it can be fixed to the cover plate by means of the toothing in a form-fitting manner. In addition, the toothing allows a replacement of the third control curve if it is defective, even if the latching fitting is already fitted, for example, to a motor vehicle seat. Although such a third control curve thus has more play than an integrally formed third control curve, this acceptable disadvantage can be avoided by designing the toothing in such a manner that an additional force-fit connection between the third control curve and the cover plate is obtained.

Further preferably, the third control curve forms an adjustment region and/or at least one latching region.

Generally, the interval of the adjustment region can be freely selected. The range of adjustment typically allows a locking of the latching fitting in an interval of about 20° and in particular 10°. A person sitting in a seat that is provided with the latching fitting may thus select a comfortable seating position. The latching region, however, allows a locking in only one rotational position. There may also be provided a plurality of adjustment regions and/or latching regions.

Preferably, the blocking arm has a control catch which is adapted to co-operating with the third control curve.

The control catch is matched with the third control curve and thus allows a smooth rotational movement and a reliable latching. Thereby a jamming of the latching fitting can be avoided, too.

It is preferred that the base plate has a ring-shaped sidewall which is adapted for covering a space extending between the base plate and the cover plate. It is further preferred that the base plate has a reinforcement structure which reinforces the base plate.

Alternatively or additionally, it is preferred that the cover plate has a ring-shaped sidewall which is adapted for covering a space extending between the base plate and the cover plate. More preferably, the cover plate has a reinforcing structure which reinforces the cover plate.

The side wall prevents ingress of impurities into the latching fitting. Thus proper functioning of the latching fitting is ensured. In addition, the side wall prevents the user from reaching into the latching fitting, thus preventing injury. The reinforcing structure, which may also include the side wall, reinforces the base plate or the cover plate and can thereby prevent deformation of the latching fitting. This is particularly of advantage when temporarily high torques are acting on the latching fitting, so that the proper functioning is still ensured under such stress.

In an advantageous embodiment, the base plate comprises a spring retainer for retaining a spring. Further, the base plate may comprise a recess for an end portion of a spring. A first opening for a shaft may be provided, too.

In an advantageous embodiment, the cover plate comprises a spring retainer for retaining a spring. Further, the cover plate may comprise a recess for an end portion of a spring. A second opening for a shaft may be provided, too.

It is preferable that the actuation plate has at least one actuation opening, in particular two actuation openings, for rotating the actuation plate. In an advantageous embodiment, the actuation plate may have a spring opening for retaining an end portion of a spring. Additionally the actuation plate may have a third opening for a shaft.

In another preferred embodiment, the latching fitting comprises a spring, in particular a leaf spring or a spiral spring, which biases the actuating plate in the direction of the locked position of the blocking arm.

Preferably the spring has a first end portion which in the installed state extends essentially parallel to the radial axis and a second end portion which extends essentially orthogonal to the radial axis. Further preferably, in the installed state the second end portion is arranged in the spring opening.

The spring pushes the blocking arm into the locked position. This ensures that as soon as the user no longer actuates the actuating plate, the blocking arm is moved back into the locked position by itself. Thus an unintentional slip of the latching fitting can be better prevented.

The spring pushes the blocking arm into the locked position. This ensures that as soon as the user no longer actuates the actuating plate, the blocking arm is moved back into the locked position by the spring load. Thus an unintentional slip of the latching fitting can be better prevented. The openings, mounts, and recesses provided for the spring allow a compact design of the latching fitting. The mounts and recesses are usually formed as depressions.

In a further preferred embodiment the latching fitting comprises between three and ten, in particular between five and eight blocking arms which are arranged on the base plate, preferably equally oriented in circumferential direction.

More preferably only one blocking arm has a control catch.

Several blocking arms increase the cogging torque. The maximum number of blocking arms depends primarily on the radius of the base plate. A particular advantage is that the one blocking arm that has the control catch, the so-called control arm, controls the other blocking arms indirectly through the actuating plate. Thus if the control arm cannot be moved from the unlocked position into the locked position, the same applies to the other blocking arms. Thereby the full 360° angle of rotation of the latching fitting can be used.

BRIEF DESCRIPTION OF THE DRAWING FIGURES

An embodiment of the invention will be explained hereinafter in reference to the attached figures. Shown are.

DETAILED DESCRIPTION

Figure 15:
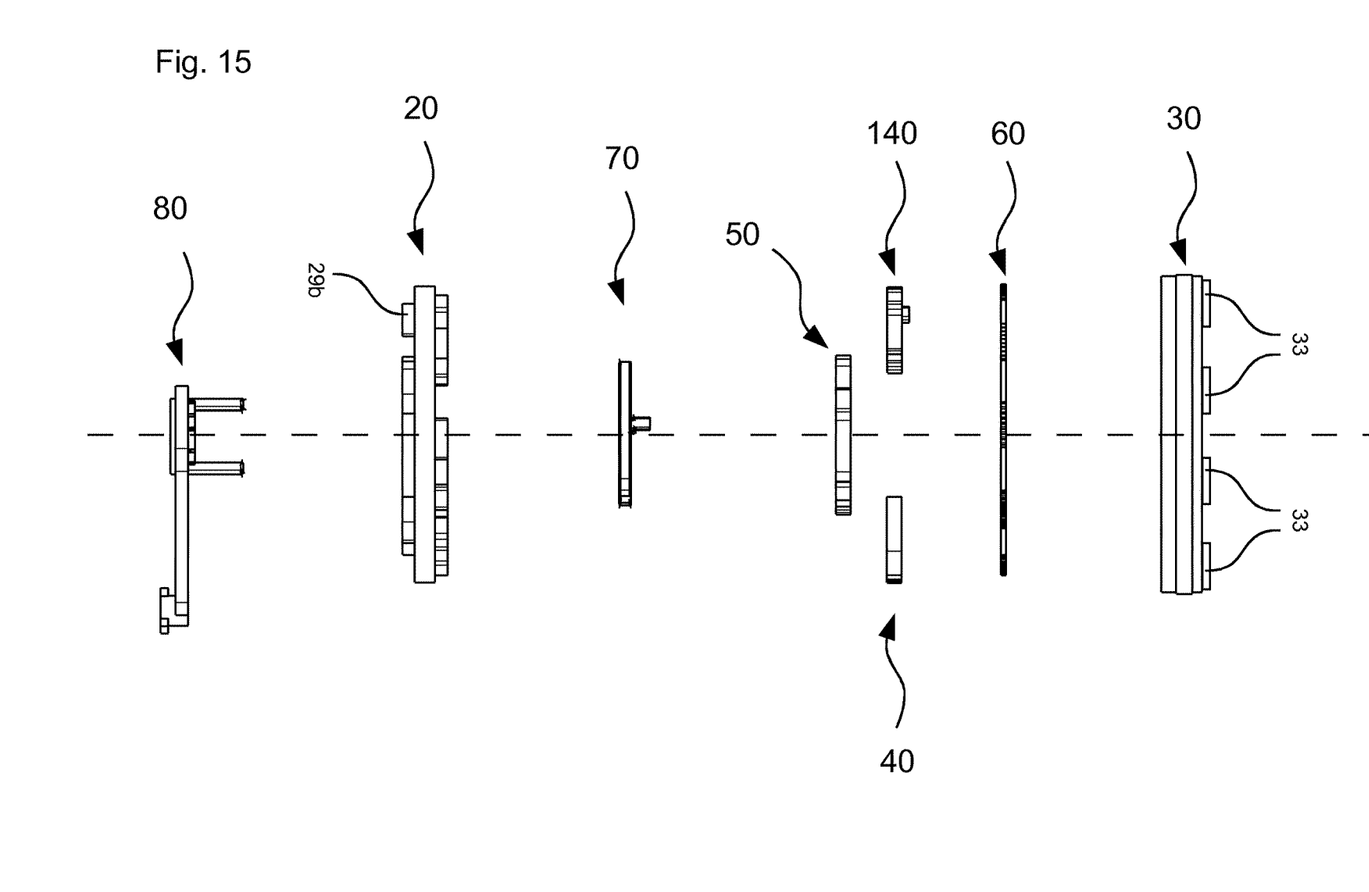

One embodiment of a latching fitting 10 comprises a base plate 20, a cover plate 30 (see FIG. 3), five blocking arms 40, an actuation plate 50, a control ring 60, a spring 70, and an actuation lever 80. A radial axis A extends in a radial direction and through the center of the latching fitting 10.

Figure 2:
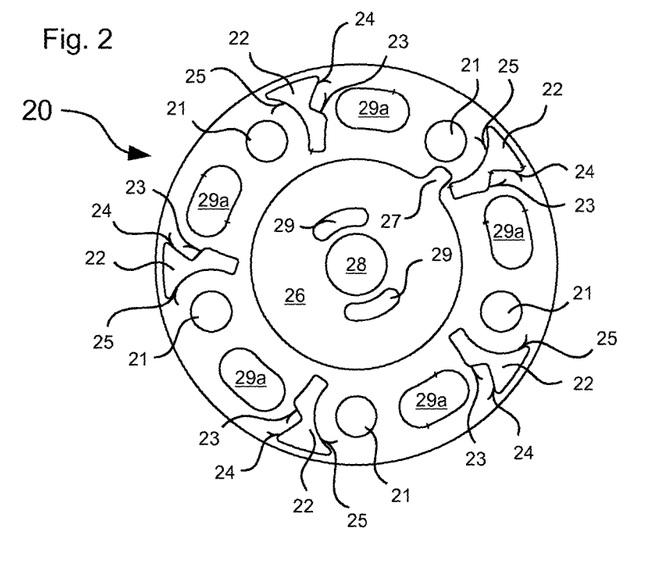
FIG. 2 a plan view of an embodiment of a base plate.

The base plate 20 comprises, as can be seen in FIG. 2, five mounting projections 21 and five supporting projections 22. In the base plate 20 a spring retainer 26 and recess 27 are formed in the shape of depressions. In the spring retainer 26 two elongated holes 29 and a first opening 28 are formed.

The mounting projections 21 are cylinder-shaped and project from a plane of the base plate 20. The mounting projections 21 are arranged equidistantly in the circumferential direction of the base plate 20.

The supporting projections 22 project from a plane of the base plate 20 in the same direction as the mounting projections 21. The supporting projections 22 have a supporting surface 23 as well as a first guiding surface 24 and a second guiding surface 25. The supporting projections 22 are arranged equidistantly in the circumferential direction of the base plate 20. Viewed in the circumferential direction the supporting projections 22 and the mounting projections 21 are arranged alternately.

The supporting surface 23 faces the radial outer side of the base plate 20. The first guiding surface 24 is formed in the shape of a circular arc and extends essentially at an angle to the radial direction of the base plate 20 and essentially orthogonal to the supporting surface 23.

The second supporting surface 25 is formed in the shape of a circular arc and faces the adjacent supporting projection 22. The second supporting surface 25 and a portion of the mounting projection 21 define a guide channel extending in the shape of a circular arc.

The spring retainer 26 and the recess 27 are connected with each other. The recess 27 is arranged between one of the mounting projections 21 and one of the supporting projections 22.

The first opening 28 is formed centrally in the base plate 20. The elongated holes 29 are formed adjacent to the first opening 28 and extend in the circumferential direction.

Elliptical projections are formed at the base plate 20. The elliptical projections project on the other side of the base plate 20 like the mounting projections 21 and the supporting projections 22. The elliptical projections form the first reinforcement structure 29a. Thereby the base plate 20 is reinforced. In addition the elliptical projections form fastening projections 29b. The fastening projections 29b serve for connecting the latching fitting 10 to a seat or a backrest. The latching fitting 10 is preferably welded to the seat or the backrest with fastening projections 29b. A form-fit connection is possible, too.

Figure 3:
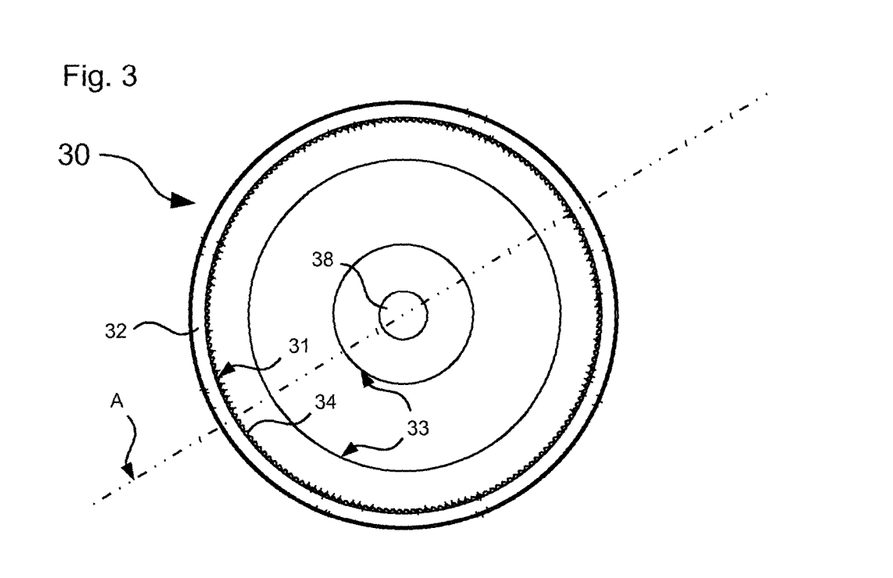
FIG. 3 a plan view of an embodiment of a cover plate.

The cover plate 30 has an inner toothing 31 and a ring-shaped sidewall 32. In the cover plate 30 a second opening 38 is formed. In addition, at the cover plate 30 a second reinforcement structure 33 is formed by protrusions and depressions in the plane of the cover plate 30.

The inner toothing 31 has first blocking teeth 34 which are arranged in the circumferential direction of the cover plate 30 and aligned radially inwards. The dimensions of the cover plate 30 are such that it can mount the base plate 20. The ring-shaped sidewall 32 then covers a space between the base plate 20 and the cover plate 30.

Figure 4:
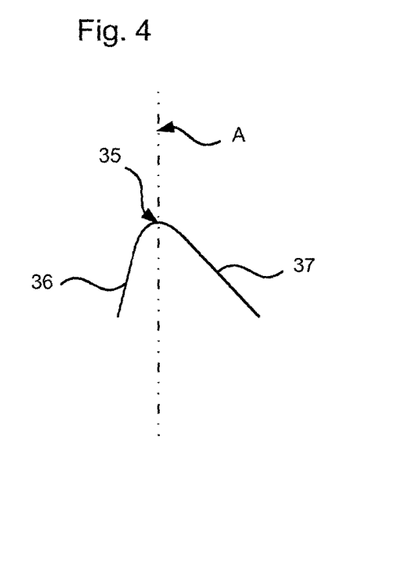
FIG. 4 a schematic representation of a tooth shape of a blocking tooth.

As shown in FIG. 4 the first blocking teeth 34 have a vertex 35, a first tooth flank 36 and a second tooth flank 37. The first tooth flank 36 extends at a different angle to the radial axis A than the second tooth flank 37. The first blocking teeth 34 are arranged at the cover plate 30 in such a manner that the first tooth flank 36 and the second tooth flank 37 are arranged alternately. That means that the first tooth flank 36 of the one first blocking tooth 34 always faces the second tooth flank 37 of the adjacent first blocking tooth 34.

Figure 5:
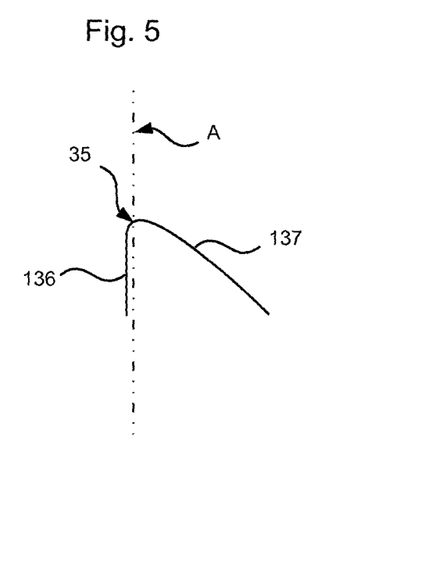
FIG. 5 a schematic representation of a further tooth shape of a blocking tooth.

FIG. 5 shows an alternative tooth shape for the first blocking teeth 34. A first tooth flank 136 extends essentially parallel to the radial axis A. A second tooth flank 137 is curved. In any case the first blocking teeth 34 are designed asymmetrical relative to the radial axis A.

Figure 6:
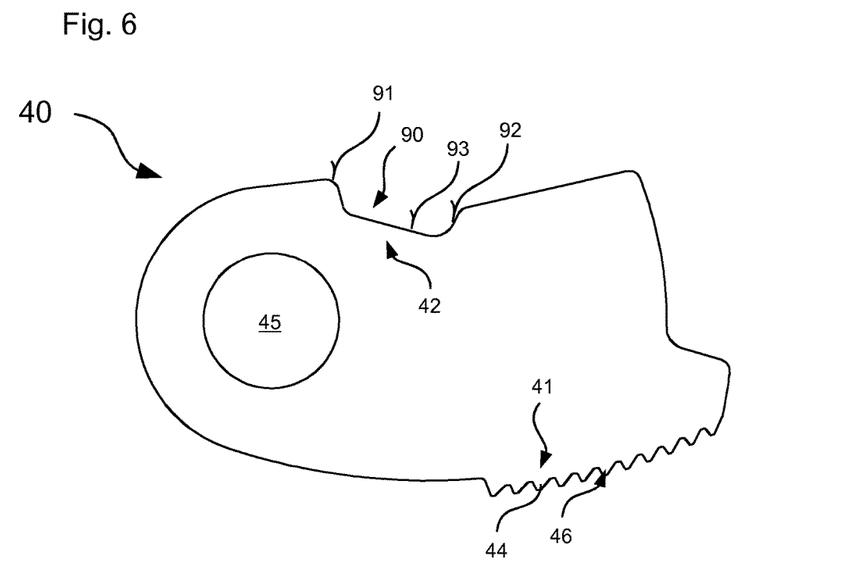
FIG. 6 a plan view of an embodiment of a blocking arm.

The blocking arm 40, which is displayed in FIG. 6, comprises a first region 41, a second region 42, and a mount opening 45. The mount opening 45 is arranged at an end portion of the blocking arm 40. The mount opening 45 is designed in such a manner that the mounting projection 21 can be inserted into it virtually without play.

In its installed state the first region 41 is arranged on a radially outer surface of the blocking arm 40. The first region 41 comprises second blocking teeth 44. The second blocking teeth 44 form a blocking portion 46. The second blocking teeth 44 are adapted for meshing with the first blocking teeth 34. The second blocking teeth 44 are formed in particular in a tooth shape shown in either of FIG. 4 and FIG. 5.

In its installed state the second region 42 is provided on a radially inner surface of the blocking arm 40. The second region 42 forms a first control curve 90. The first control curve 90 has a first unlocking region 91, a first locking region 92 and a first supporting region 93.

The unlocking region 91 is initially curved and forms a re-entrant flank. The flank merges into the supporting region 93, which essentially extends along the extension direction of the blocking arm 40. Adjacent to it there is the locking region 92, which is also formed by a flank with an adjacent curved region. The functioning of the regions will be described hereinafter.

Figure 7:
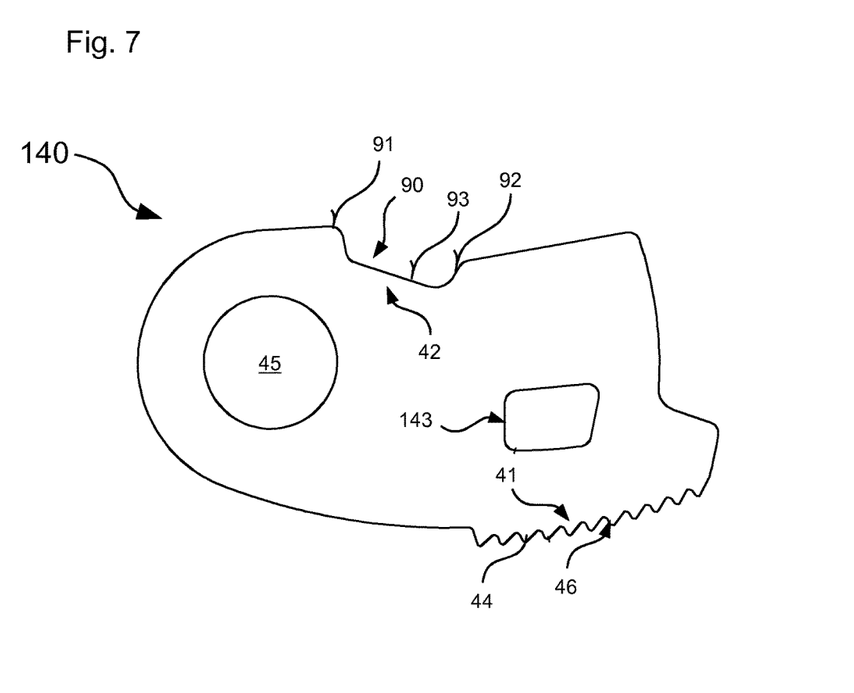
FIG. 7 a plan view of a further embodiment of the blocking arm.

As can be seen in FIG. 7 a blocking or control arm 140 is designed almost identically to the blocking arm 40. The blocking arm 140 additionally comprises a control catch 143. The control catch 143 projects from a plane of the blocking arm 140. The control catch 143 is adapted to co-operating with a control curve.

Figure 8:
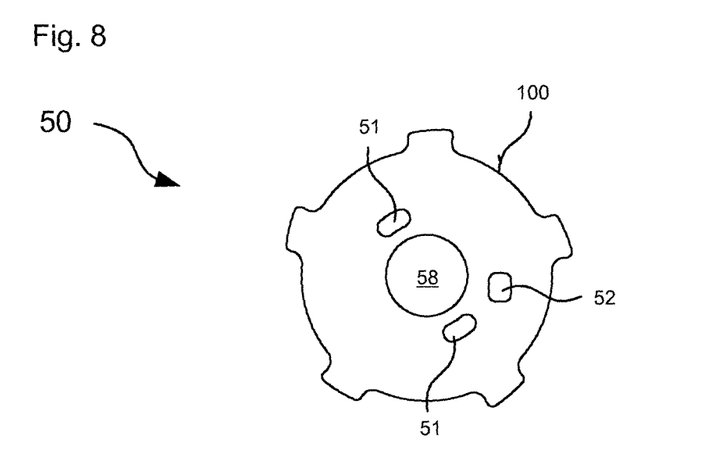
FIG. 8 a plan view of an embodiment of an actuating plate.

The actuating plate 50 comprises two actuating openings 51, a spring opening 52 and a third opening 58. The third opening 58 is formed centrally in the actuation plate 50. The two actuation openings 51 are formed adjacent to the third opening 58. The outer circumferential surface of the actuating plate 50 forms a second control curve 100.

The second control curve 100 has a total of five second unlocking regions 101, five second locking regions 102, and five second supporting regions 103. The second control curve 100 is explained with reference to FIG. 9, which shows a part of the second control curve 100.

Figure 9:
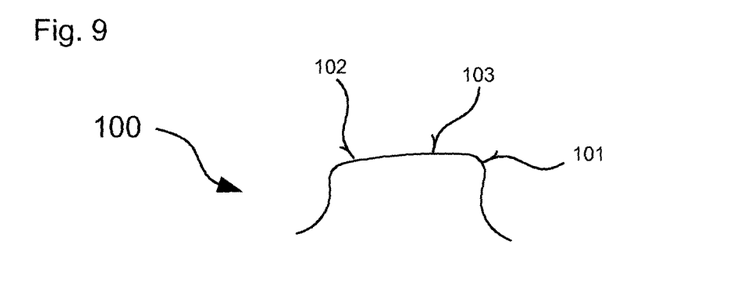
FIG. 9 an enlarged portion of a second control curve from FIG. 8.

Initially the second unlocking region 101 substantially extends in a radial direction of the actuating plate 50 towards the outside. Adjacent to this there is a curved region. The curved region merges into the second supporting region 103 which substantially extends along the circumferential direction of the actuating plate 50. Adjacent to this there is the second locking region 102, which merges into a curved region and then extends back to the primary circumference of the actuating plate 50.

Figure 10:
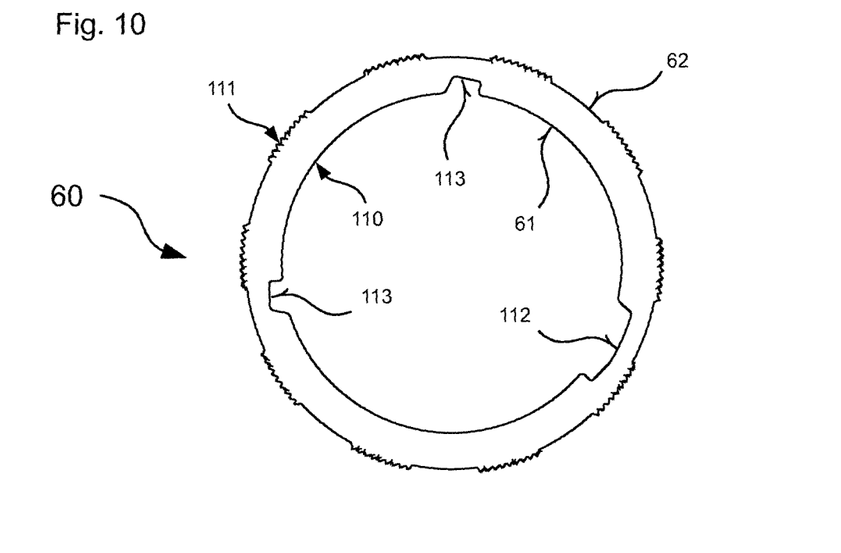
FIG. 10 a plan view of an embodiment of a control ring.

A third control curve 110 is formed by the control ring 60, which is designed annular. The third control curve 110 extends along an inner circumferential surface 61 of the control ring 60. Additionally, the third control curve 110 has a toothing 111 which is provided on an outer circumferential surface 62 of the control ring 60. The third control curve 110 does not have to be formed by a control ring 60, but may be formed integrally with the cover plate 30. In this case the toothing 111 is redundant.

Figure 11:
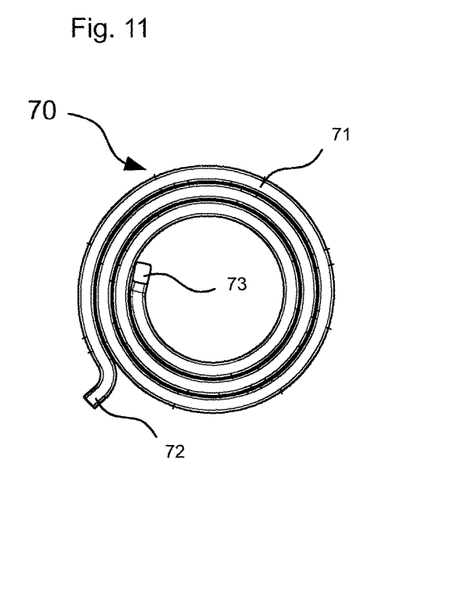
FIG. 11 a plan view of an embodiment of a spring.
Figure 12:
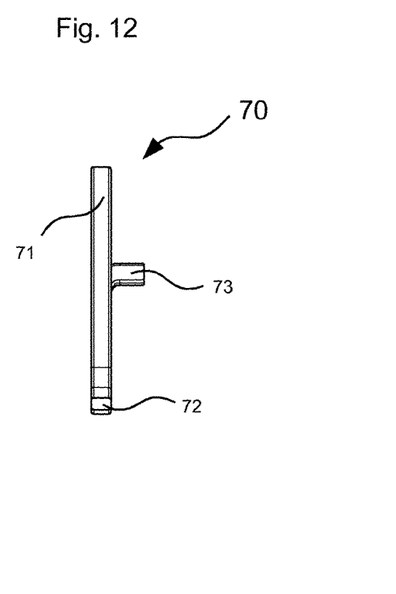
FIG. 12 a lateral view of the spring from FIG. 11.

The third control curve 110 has an adjustment region 112 and two latching regions 113. The adjustment region 112 and the two latching regions 113 are formed as recesses in the control ring 60. The adjustment region 112 and the latching region 113 define the positions in which the blocking arms 40 can be shifted from the unlocked position into the locked position The spring 70, shown in FIG. 11 and FIG. 12, is designed as a spiral spring 71. The spring 70 may be formed, for instance, as a leaf spring as well. The spring 70 has a first end portion 72 and a second end portion 73. First end portion 72 extends in the plane of the spring 70 radially outwards. The second end portion 73 substantially extends perpendicular to the plane of the spring 70. The spiral spring 71 is designed in such a way that a shaft can extend through it.

Figure 13:
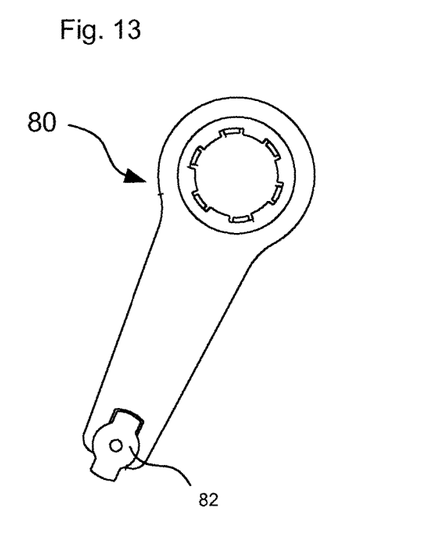
FIG. 13 a plan view of an embodiment of an actuating lever.
Figure 14:
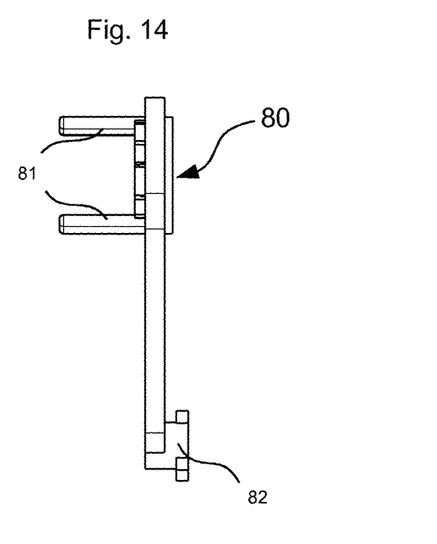
FIG. 14 a lateral view of the actuating lever from FIG. 13 and
FIG. 15 an exploded view of the latching fitting.

FIG. 13 and FIG. 14 show the actuating lever 80. The actuating lever 80 has two actuating projections 81 and one actuating handle 82. The two actuating projections 81 substantially extend perpendicular to the plane of the actuating lever 80. The actuating handle 82 extends towards the side facing away from the actuating projections 81.

The actuating lever 80 may be connected to a shaft (not shown) which extends in the same direction between the actuating projections 81. The dimensions of the shaft are such that it can be inserted in the first through third opening 28, 38, 58. The shaft can also be designed in such a way that it can be rotatably mounted at least in one of the first to third openings 28, 38, 58.

The assembly of the latching fitting 10 is explained with reference to FIG. 15. First, the base plate 20 is provided. Then the spiral spring 71 is inserted into the spring retainer 26. The first end portion 72 rests in the recess 27. Next, four blocking arms 40 and one barrier or control arm 140 are rotatably arranged with the mount openings 45 on the mounting projections 21. In the process, one of the locking arms 40, 140 is brought in such a position that the first end portion 72 is secured against slipping out.

The actuating plate 50 is arranged in such a way that the first opening 28 and the third opening 58 are aligned with each other. Then the second end portion 73 is inserted into the spring opening 52. The actuating plate 50 is arranged in such a way that the blocking arms 40, 140 can be shifted into the unlocked position.

The unlocked position is obtained when the blocking arms 40, 140 are pivoted towards the center of the base plate 20. The locked position is attained when the blocking arms 40, 140 are pivoted towards the outside and the first blocking teeth 34 mesh with the second blocking teeth 44.

The third control curve 110 is inserted into the cover plate 30 in the form of the control ring 60. Then the cover plate 30 is put over the base plate 20. The ring-shaped sidewall 32 thereby covers the space between base plate 20 and the cover plate 30, thus protecting the components located therein.

In the final step the actuating lever 80 is fitted. The actuating projections 81 are inserted through the elongated holes 29 and rest in the actuating openings 51. The latching fitting 10 can then be completed, for instance, by bonding, soldering, welding, and the like.

If the actuating lever 80 has a shaft, this shaft can be rotatably mounted at the second opening 38 by means of a clip connection. Thereby, too, the latching fitting 10 is held together.

Figure 1:
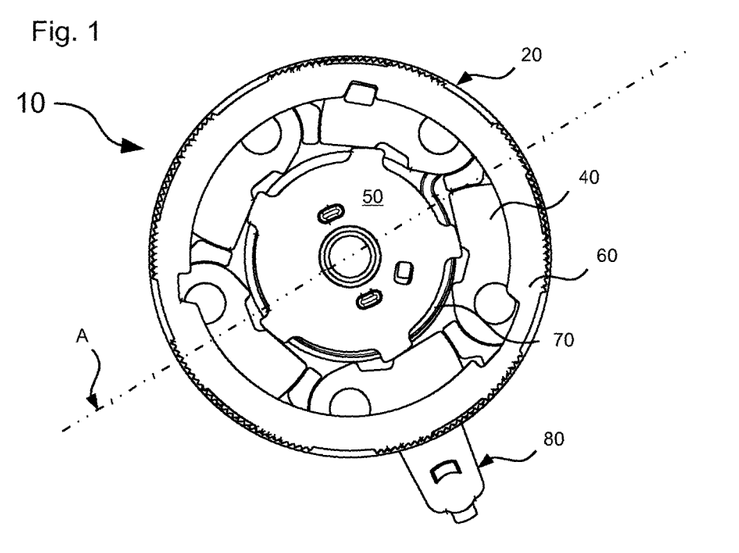
FIG. 1 a plan view of an embodiment of the latching fitting without cover plate.

Based on FIG. 1, the functioning of the latching fitting 10 is explained below. Initially the latching fitting 10 is blocked. The blocking arms 40, 140 are in the locked position. The control catch 143 is located in one of the latching portions 113. The blocking arms 40, 140 are pushed outwards by the second supporting portions 103, which are in contact with the first locking regions 92. The first blocking teeth 34 mesh with the second blocking teeth 44.

For unlocking the latching fitting 10, the actuating lever 80 is pushed clockwise. Thereby the actuating plate 50 is rotated clockwise, too, against the spring force of the spring 70. The second supporting portions 103 lose contact with the first locking portions 92. Due to the virtually play-free mounting of the blocking arms 40, 140, the blocking arms 40, 140 remain in the locked position.

If the operating plate 50 is further rotated, the second unlocking regions 101 engage into the first unlocking regions 91. The blocking arms 40, 140 start moving towards the unlocked position. Thereby the end portions of the blocking arms slide along the first guiding surface 24 and the second guiding surface 25 and are guided by these virtually without play. The movement continues until the blocking arms 40, 140 rest on the respective supporting surfaces 23. The blocking arms 40, 140 are now in the unlocked position. The base plate 20 can be rotated relative to the cover plate 30.

When the base plate 20 is rotated relative to the cover plate 30 the control catch 143 slides along the third control curve 110. When the actuating lever 80 is no longer actuated in the unlocking direction (clockwise), the base plate 20 is still rotatable relative to the cover plate 30. The spring force biases the actuator plate 50 in the locking direction (counter-clockwise), and the second locking region 102 and the first locking region 92 engage into each other. However, the control nose 143 prevents movement of the blocking arm 140, so that the operating plate 50 does not exert any force on the other blocking arms 40. The spring force is virtually directed through the control catch 143 into the control ring 60. The second supporting region 103 supports the blocking arms 40, 140 at the first supporting region 93.

For instance, if the cover plate 30 is rotated in such a manner that the control catch 143 reaches the adjustment region 112, the blocking arm 140 can move. The second locking region 102 pushes the first locking region 92 outwards. The second supporting region 103 engages with the first locking region 92 and pivots the blocking arms 40, 140 back into the locked position. If at the same time a torque, too, acts on the latching fitting 10, the movement of the blocking arms 40, 140 in the locked position, in other words the snapping, is facilitated by the shape of the first locking teeth 34 and the second locking teeth 44. The latching fitting 10 is blocked.

The latching fitting 10 according to the present invention has a substantially higher cogging torque in one of its rotation directions than in the other rotation direction. This is achieved through the asymmetrical design of the blocking teeth 34, 44. Such a design also allows a more reliable engagement of the locking teeth 34, 44 at higher angular velocities, too. Wear of the latching fitting 10 can be reduced as well as the noise emissions during actuation.

Having a diameter of only 62 mm and employing five blocking arms 40, 140, the latching fitting 10 according to the present invention can obtain a cogging torque of up to 2000 Nm. An adjusting increment of 2° allows precise positioning of a backrest into the desired position.

| | Reference list |
|---|---|
| 10 | latching fitting |
| 20 | base plate |
| 21 | mounting projection |
| 22 | supporting projection |
| 23 | supporting surface |
| 24 | first guiding surface |
| 25 | second guiding surface |
| 26 | spring retainer |
| 27 | recess |
| 28 | first opening |
| 29 | elongated hole |
| 29a | first reinforcement structure |
| 29b | fastening projection |
| 30 | cover plate |
| 31 | inner toothing |
| 32 | sidewall |
| 33 | second reinforcement structure |
| 34 | first blocking tooth |
| 35 | vertex |
| 36 | first tooth flank |
| 37 | second tooth flank |
| 38 | second opening |
| 40 | blocking arm |
| 41 | first region |
| 42 | second region |
| 43 | control catch |
| 44 | second blocking tooth |
| 45 | bearing opening |
| 46 | blocking portion |
| 50 | actuating plate |
| 51 | actuating opening |
| 52 | spring opening |
| 58 | third opening |
| 60 | control ring |
| 61 | inner circumferential surface |
| 62 | outer circumferential surface |
| 70 | spring |
| 71 | spiral spring |
| 72 | first end portion |
| 73 | second end portion |
| 80 | actuation lever |
| 81 | actuating projection |
| 82 | actuating handle |
| 90 | first control curve |
| 91 | first unlocking region |
| 92 | first locking region |
| 93 | first supporting region |
| 100 | second control curve |
| 101 | second unlocking region |
| 102 | second locking region |
| 103 | second supporting region |
| 110 | third control curve |
| 111 | toothing |
| 112 | adjustment region |
| 113 | latching region |
| 140 | blocking arm/control arm |

-continued

| Reference list | |
|---|---|
| 143 | control catch |
| A | radial axis |

The invention claimed is:

1. A latching fitting for a seat of a motor vehicle, comprising:
   a base plate having a plurality of mounting projections;
   a cover plate that is rotatable relative to the base plate and has an inner toothing;
   a plurality of blocking arms equally oriented in a circumferential direction, each mounted on one of the mounting projections and pivotable between an unlocked position, in which a rotation of the cover plate relative to the base plate is possible, and a locked position, in which a rotation of the cover plate (30) relative to the base plate is blocked;
   an actuation plate that is rotatable relative to the base plate by means of which the blocking arms are movable between the unlocked position and the locked position;
   a control ring controlling the movement of the blocking arms, which has an inner circumferential surface and a spring which biases the actuation plate in direction of the locked position;
   the inner toothing having first blocking teeth which have a vertex and are arranged in an asymmetrical manner relative to a radial axis (A) which runs through the vertex;
   each of the blocking arms comprising a blocking portion which has second blocking teeth which mesh with the first blocking teeth in the locked position;
   each of the blocking arms forming a first control curve which has a first unlocking region, a first locking region, and a first supporting region;
   the actuation plate forming a second control curve that co-operates with the first control curve which has a second unlocking region, a second locking region, and a second supporting region;
   the inner circumferential surface of the control ring forming a third control curve which has an adjustment region and at least one latching region, and
   at least one of the blocking arms having a control catch that co-operates with the third control curve; and
   the control ring having an outer circumferential surface which is provided in an intermittent manner with a toothing, the toothing of the outer circumferential surface fixing the control ring to the cover plate by meshing the inner toothing of the cover plate in a force-fitting manner.

2. The latching fitting of claim 1, wherein at least one of (a) each of the first locking teeth and (b) each of the second locking teeth has a first tooth flank, which extends essentially parallel to the radial axis (A), and a second tooth flank, which extends in an acute angle to the radial axis (A) or is curved.

3. Latching fitting of claim 1, wherein each of the mounting projections has a cylindrical shape, and each of the blocking arms is mounted on one of the mounting projections without significant play.

4. The latching fitting of claim 1, wherein the base plate has at least one supporting projection which has a supporting surface which is adapted for supporting one of the blocking arms as well as a first guiding surface and a second guiding surface both of which are adapted for guiding a portion of one of the blocking arms without substantial play.

5. The latching fitting of claim 1, wherein each of the blocking arms has a mount opening.

6. The latching fitting of claim 1, wherein the cover plate has a ring-shaped sidewall which is adapted for covering a space extending between the base plate and the cover plate.

7. The latching fitting of claim 1, wherein at least one of the base plate and the cover plate has a spring retainer for retaining the spring and at least one of a recess for an end portion of the spring and an opening for an actuation lever.

8. The latching fitting of claim 1, wherein the actuation plate has at least one of (a) an actuation opening for rotating the actuation plate (50) and (b) a spring opening (52) for retaining an end portion of the spring.

9. The latching fitting of claim 8, wherein the actuation plate has at least one opening for an actuation lever.

10. The latching fitting of claim 1, wherein the spring is arranged as a leaf spring or a spiral spring and has a first end portion which extends essentially parallel to the radial axis (A) and a second end portion which extends essentially orthogonal to the radial axis (A).

11. The latching fitting of claim 10, wherein the base plate has a spring retainer for retaining the spring and a recess for the first end portion of the spring.

12. The latching fitting of claim 11, wherein the actuation plate has a spring opening for retaining the second end portion of the spring.

13. The latching fitting of claim 1, wherein each of the mounting projections is designed in a cylindrical shape, each of the blocking arms is mounted on one of the mounting projections, and the base plate has at least one supporting projection which has a supporting surface which is adapted for supporting one of the blocking arms, as well as a first guiding surface and a second guiding surface both of which are adapted for guiding a portion of one of the blocking arms.

14. The latching fitting of claim 13, wherein each of the blocking arms has a mount opening through which one of the mounting projections is insertable.

15. The latching fitting of claim 14, wherein the base plate includes a first guiding surface and a second guiding surface, both of which are adapted for guiding a portion of one of the blocking arms.

16. The latching fitting of claim 1, wherein each of the first and second locking teeth has a first tooth flank which extends essentially parallel to the radial axis (A), and a second tooth flank which extends in an acute angle to the radial axis (A).

* * * * *